US012594661B2

(12) United States Patent
Shimizu

(10) Patent No.: US 12,594,661 B2
(45) Date of Patent: Apr. 7, 2026

(54) OPERATING LEVER MECHANISM FOR ELECTRIC HANDHELD WORKING MACHINE

(71) Applicant: YAMABIKO CORPORATION, Tokyo (JP)

(72) Inventor: Kunio Shimizu, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 19/040,129

(22) Filed: Jan. 29, 2025

(65) Prior Publication Data

US 2025/0262742 A1 Aug. 21, 2025

(30) Foreign Application Priority Data

Feb. 19, 2024 (JP) ................................ 2024-022870

(51) Int. Cl.
*B25F 5/02* (2006.01)
*B27B 17/00* (2006.01)

(52) U.S. Cl.
CPC ............ *B25F 5/02* (2013.01); *B27B 17/0008* (2013.01)

(58) Field of Classification Search
CPC ............................... B25F 5/02; B27B 17/0008
See application file for complete search history.

(56) References Cited

U.S. PATENT DOCUMENTS 3,780,246 A * 12/1973 Beckering ................ H01H 3/20 200/332.2
3,873,796 A * 3/1975 Worobec, Jr. ............ H01H 9/06 200/332.2
3,971,906 A * 7/1976 Sahrbacker ............... B25F 5/02 200/43.17
5,638,945 A * 6/1997 Fukinuki .................. H01H 3/20 200/321
5,969,312 A * 10/1999 Svetlik ..................... H01H 3/20 83/DIG. 1
6,987,244 B2 * 1/2006 Bauer ....................... B23K 9/32 219/137.42
8,100,234 B2 * 1/2012 Stehle ...................... F16D 49/02 188/251 A (Continued)

FOREIGN PATENT DOCUMENTS

| | | |
|---|---|---|
| DE | 7321450 U | 9/1973 |
| EP | 1535508 A2 | 6/2005 |
| EP | 3140082 B1 | 7/2021 |

*Primary Examiner* — Lucas E. A. Palmer
(74) *Attorney, Agent, or Firm* — BACON&THOMAS, PLLC

(57) ABSTRACT

There is provided an operating lever mechanism including: a trigger lever to actuate an electric working device; a slide member provided to be able to slide in a direction in which the handle extends, the slide member being configured to lock the trigger lever when the slide member is not operated, and to unlock the trigger lever when the slide member is slid; and a grip lever operated by gripping the handle by one hand, the grip lever being configured not to allow the slide member to slide when the grip lever is not operated, and to allow the slide member to slide when the grip lever is operated. The slide member is slid while the handle is gripped by the one hand and the grip lever is operated, and therefore the trigger lever is unlocked.

7 Claims, 6 Drawing Sheets

(56) References Cited

U.S. PATENT DOCUMENTS

| | | | | |
|---|---|---|---|---|
| 8,151,471 | B2 * | 4/2012 | Tomiyama | A01D 34/90 200/321 |
| 8,353,362 | B2 * | 1/2013 | Liebhard | A01G 3/053 173/217 |
| 8,833,485 | B2 * | 9/2014 | Svennung | A01G 3/053 173/217 |
| 9,636,792 | B2 | 5/2017 | Mandalka et al. | |
| 10,014,128 | B2 * | 7/2018 | Kannan | B25F 5/02 |
| 10,195,703 | B2 * | 2/2019 | Boeck | B25F 5/00 |
| 10,427,317 | B2 * | 10/2019 | Martinsson | B23Q 11/0089 |
| 10,605,406 | B2 * | 3/2020 | Martinsson | B27B 17/00 |
| 10,875,108 | B2 * | 12/2020 | Hart | B23D 47/025 |
| 11,938,608 | B2 * | 3/2024 | Hatakeyama | B24B 23/028 |
| 2005/0224325 | A1 * | 10/2005 | Turley | B24B 23/028 200/50.32 |
| 2009/0064504 | A1 * | 3/2009 | Kodama | A01G 3/053 30/296.1 |
| 2009/0119933 | A1 * | 5/2009 | Mace | B23D 57/023 30/277.4 |
| 2011/0168422 | A1 * | 7/2011 | Fujiwara | B24B 23/028 173/217 |
| 2013/0023189 | A1 * | 1/2013 | Numata | B23Q 11/0092 451/344 |
| 2013/0277189 | A1 * | 10/2013 | Yuan | H01H 3/20 200/332 |
| 2014/0215839 | A1 * | 8/2014 | Abe | B25F 5/001 30/388 |
| 2018/0200917 | A1 * | 7/2018 | Kachi | B27B 17/0008 |
| 2018/0215002 | A1 * | 8/2018 | Gorenflo | F02N 11/08 |
| 2018/0339421 | A1 * | 11/2018 | Yates | B23B 47/287 |
| 2019/0217496 | A1 * | 7/2019 | Shibata | B27B 17/02 |
| 2020/0384664 | A1 * | 12/2020 | Yang | B27B 17/083 |
| 2021/0146497 | A1 * | 5/2021 | Ikuta | B24B 23/028 |
| 2022/0072732 | A1 * | 3/2022 | Schlosser | B23D 57/023 |
| 2022/0256774 | A1 * | 8/2022 | Shimizu | B27B 17/0008 |
| 2023/0405692 | A1 * | 12/2023 | Rentmeester | B23D 15/12 |

* cited by examiner

OPERATING LEVER MECHANISM FOR ELECTRIC HANDHELD WORKING MACHINE

CROSS-REFERENCE TO RELATED APPLICATIONS

The present application claims priority from Japanese Patent Application No. 2024-022870 filed on Feb. 19, 2024, and the entire contents of which are hereby incorporated by reference.

BACKGROUND

1. Technical Field

The present invention relates to an operating lever mechanism for an electric handheld working machine.

2. Related Art

A handheld working machine such as a brush cutter, a hedge trimmer, and a chain saw includes a handle gripped by an operator's hand, and this handle has a trigger lever to start a working device. In general, this trigger lever includes a mechanism to lock the trigger lever when it is not operated, in order to eliminate movements not intended by the operator to secure safety. The electric handheld working machine has a problem that it is difficult for the operator to recognize whether the working device can be immediately started, compared to an engine-driven handheld working machine that allows the operator to recognize an idling state based on the engine sound. Therefore, electric handheld working machines are required by a standard for a safety measure that the trigger lever is not unlocked unless intended two-step operation is performed (see IEC standard 62841-1).

As related art meeting the above-described standard, there has been proposed a mechanism that does not allow an unlocking lever to be pushed only by gripping a handle in order to avoid erroneous unlocking, but allows the unlocking lever to be pushed by pushing a button on the side surface of the handle. See U.S. Pat. No. 9,636,792. The entire contents of this disclosure are hereby incorporated by reference.

SUMMARY

According to the invention, an operating lever mechanism provided in a handle of an electric handheld working machine includes: a trigger lever to actuate an electric working device; a slide member provided to be able to slide in a direction in which the handle extends, the slide member being configured to lock the trigger lever when the slide member is not operated, and to unlock the trigger lever when the slide member is slid; and a grip lever operated by gripping the handle by one hand, the grip lever being configured not to allow the slide member to slide when the grip lever is not operated, and to allow the slide member to slide when the grip lever is operated. The slide member is slid while the handle is gripped by the one hand and the grip lever is operated, and therefore the trigger lever is unlocked.

DETAILED DESCRIPTION

U.S. Pat. No. 9,636,792 describes that the direction in which the button on the side surface of the handle is pushed is different from the direction in which the unlocking lever is operated by gripping the handle. Therefore, although the erroneous unlocking is not likely to occur, the operator must perform complicated operation, that is, perform two actions in the different directions while gripping the handle by one hand, in order to unlock the trigger lever.

In particular, in order to push the button while gripping the handle by one hand, the operator needs to push the button by the thumb. When the thumb leaves the grip of the handle to push the button, the grip strength of the one hand gripping the handle is decreased. Therefore, with the related art, when the weight of the machine body is heavy, it is not possible to stably hold this heavy weight by one hand due to the decrease in the grip strength. This causes a problem that it is not possible to smoothly push the button.

In addition, in recent years, engine-driven handheld working machines tend to be changed to the electric motor-driven type in consideration of the environment, noise, and so forth. The safety measure against the trigger lever required for the engine-driven handheld working machines is not stricter than the electric motor-driven type because the operator can recognize the idling state as described above. Therefore, in the case of the engine-driven handheld working machines, the trigger lever can be relatively easily unlocked to be operated. When the engine-driven handheld working machines are changed to the electric motor-driven type, it is required to unlock the trigger lever meeting the above-described safety standard for the electric motor-driven type. However, the electric motor-driven type is required of users to have the operationality comparable with the engine-driven type while meeting the safety standard.

The present invention is proposed to address the above-described problems. That is, the problems to be solved by the invention are to make it possible to secure the operationality comparable with the engine-driven type while meeting the safety standard for unlocking the trigger lever, and to make it possible to unlock the trigger lever with good operationality without decreasing the grip strength of one hand gripping the handle.

Hereinafter, an embodiment of the present invention will be described with reference to the drawings. The same reference numbers in the different drawings indicate the same functional parts, and therefore repeated description for each of the drawings is omitted.

Figure 1:
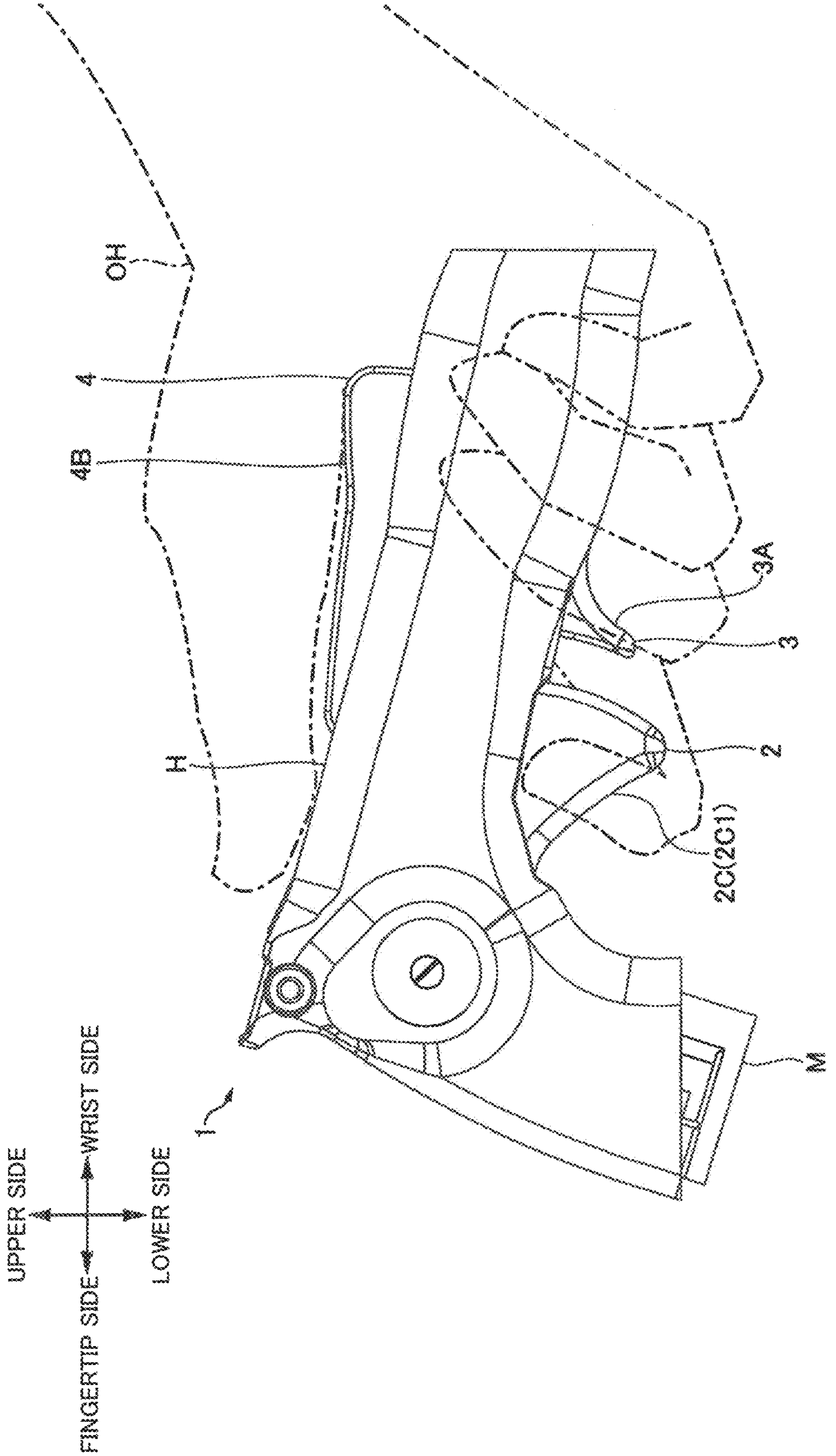
FIG. 1 is a side view illustrating the appearance of an operating lever mechanism according to an embodiment of the invention.

As illustrated in FIG. 1, an operating lever mechanism 1 is provided in a handle H of an electric handheld working machine (not illustrated), and includes a trigger lever 2, a slide member 3, and a grip lever 4. The handle H can be gripped by one hand OH as illustrated by virtual lines, and the grip strength is secured by keeping the thumb of the one hand OH put on the handle H.

The trigger lever 2 is an operating member to start an electric working device (not illustrated) of the electric handheld working machine. The operator pushes the trigger lever 2 into the handle H by the index finger (referred to as "ON operation") while gripping the handle H by the one hand OH to start the electric working device.

The slide member 3 is provided to be able to slide in the direction in which the handle H extends (from the fingertip side to the wrist side of the hand). The slide member 3 is configured to lock the trigger lever 2 when the slide member 3 is not operated, and to unlock the trigger lever 2 when the slide member 3 is slid. The slide member 3 is provided on the lower side of the handle H as well as the trigger lever 2, so that the operator can slide the slide member 3 by the middle finger or the third finger while gripping the handle H by the one hand OH.

The grip lever 4 is operated by gripping the handle H by the one hand OH of the operator. The grip lever 4 does not allow the slide member 3 to slide when the grip lever 4 is not operated, but allows the slide member 3 to slide when the grip lever 4 is operated. The grip lever 4 is located on the upper side of the handle H to allow the operator to operate the grip lever 4 by the palm of the operator's hand. The grip lever 4 is operated by one action of the operator, that is, gripping the handle H.

When this operating lever mechanism 1 is not operated, the trigger lever 2 is locked by the slide member 3. Then, the operator slides the slide member 3 while gripping the handle H by the one hand OH to operate the grip lever 4. By this means, the trigger lever 2 is unlocked, and therefore can be operated. Thus, the trigger lever 2 is not unlocked unless two actions in the different directions are performed, that is, the grip lever 4 is operated and the slide member 3 is slid. Therefore, even though the operator unconsciously try to operate the trigger lever 2 independently, the trigger lever 2 is not unlocked and cannot be operated.

In addition, although the grip lever 4 needs to be operated, and also the slide member 3 needs to be slid to unlock the trigger lever 2, the grip lever 4 is operated by one action, gripping the handle H, and the operation is not complicated. Moreover, the slide member 3 can be slid by the middle finger or the third finger while the operator grips the handle H keeping the thumb put on the handle H, and therefore can be easily operated without decreasing the grip strength of the hand gripping the handle H.

FIG. 2 to FIG. 5 illustrate the internal structure of the handle H. With reference to these drawings, specific examples of the operating lever mechanism 1 will be described. The trigger lever 2 includes a pivot part 2A provided in the middle of the handle H, and an actuation part 2B provided at one end of the trigger lever 2 extending from the pivot part 2A into the handle H. In addition, the trigger lever 2 includes an operating part 2C provided at the other end protruding from the pivot part 2A to the outside of the handle H.

The pivot part 2A of the trigger lever 2 includes a shaft hole into which a shaft protrusion H1 provided in the handle H is inserted, and pivotably supports the trigger lever 2 around the shaft protrusion H1. The operating part 2C of the trigger lever 2 protruding outward from the handle H is pushed into the handle H ("ON operation"), so that the actuation part 2B swings around the pivot part 2A to press a switch M1 of an electric actuator M. As a result, the electric working device (not illustrated) is started.

A torsion spring (not illustrated) is wound around the shaft protrusion H1 of the handle H. One arm of the torsion spring is fixed to the inside of the handle H, and the other arm of the torsion spring is fixed to the trigger lever 2. By this means, the trigger lever 2 is spring energized by the torsion spring such that the operating part 2C protrudes from the handle H and the actuation part 2B is spaced from the switch M1, that is, the trigger lever 2 is placed in the unoperated state. In this state, when the operator stops applying the pushing force to the trigger lever 2, the trigger lever 2 automatically returns to the unoperated state (referred to as "OFF operation").

In addition, the operating part 2C of the trigger lever 2 includes a trigger part 2C1 on which the finger puts to perform the ON operation, and also includes an escape groove 2C2 and an interference end 2C3 which are associated with the slide member 3 described later. The escape groove 2C2 includes an opening formed inside the handle H, and the interference end 2C3 is provided to extend in the up-to-down direction along the escape groove 2C2.

The slide member 3 is engaged with a guide groove H2 which is formed inside the handle H and linearly extends along the longitudinal direction of the handle H (from the fingertip side to the wrist side of the hand). The slide member 3 can be slid along the guide groove H2. One slide end of the slide member 3 is located on the wrist side of the hand gripping the handle H, and the other slide end of the slide member 3 is located on the fingertip side of the hand gripping the handle H. The slide member 3 is spring energized by a coil spring H3 so that the slide end of the slide member 3 on the wrist side is located at the position of the unoperated state.

The slide member 3 includes a protruding part 3A protruding downward from the handle H to be operated by a finger; an unlocking hole 3B located on the fingertip side with respect to the protruding part 3A; and a lock abutting part 3C located on the fingertip side with respect to the unlocking hole 3B. When the slide member 3 is located at the position of the unoperated state, the lock abutting part 3C abuts on the head end of the interference end 2C3 of the trigger lever 2 to lock the trigger lever 2. When the slide member 3 is slid to the slide end on the fingertip side, the interference end 2C3 of the trigger lever 2 can be inserted into the unlocking hole 3B, and also the lock abutting part 3C of the slide member 3 can be inserted into the escape groove 2C2 of the trigger lever 2. As a result, the trigger lever 2 can be unlocked. In addition, when the slide member 3 is slid to the slide end on the fingertip side, the protruding part 3A protruding downward from the handle H is brought close to the operating part 2C of the trigger lever 2.

The grip lever 4 includes a pivot part 4A on one end side. The pivot part 4A is pivotably supported around a shaft protrusion H4 provided in the handle H. An operating part 4B of the grip lever 4 extends in the longitudinal direction of the handle H (from the fingertip side to the wrist side of the hand) and protrudes upward from the upper side of the handle H. A torsion spring (not illustrated) is wound around the shaft protrusion H4. One arm of the torsion spring is fixed to the inside of the handle H, and the other arm of the torsion spring is fixed to the grip lever 4. By this means, the grip lever 4 is spring energized by the torsion spring to be placed in the unoperated state in which the operating part 4B protrudes from the handle H.

The grip lever 4 includes a stopper 4C to prohibit the slide member 3C from sliding. The stopper 4C is located to prohibit the slide member 3 from sliding when the grip lever 4 is not operated, and moves to the position to permit the slide member 3 to slide when the grip lever 4 is operated.

The stopper 4C may be disposed to directly prohibit the slide member 3 from sliding. However, with the illustrated example, a cooperating member 5 configured to move together with the slide member 3 is provided inside the handle H, and the stopper 4C prohibits the slide member 3 from sliding via the cooperating member 5.

When the grip lever 4 is not operated, a part (stopper 4C) of the grip lever 4 is located to interfere with the movement of the cooperating member 5, and therefore the slide member 3 cannot slide. Meanwhile, when the grip lever 4 is operated, the part (stopper 4C) of the grip lever 4 is located not to interfere with the cooperating member 5 to allow the slide member 3 to slide.

Figure 2:
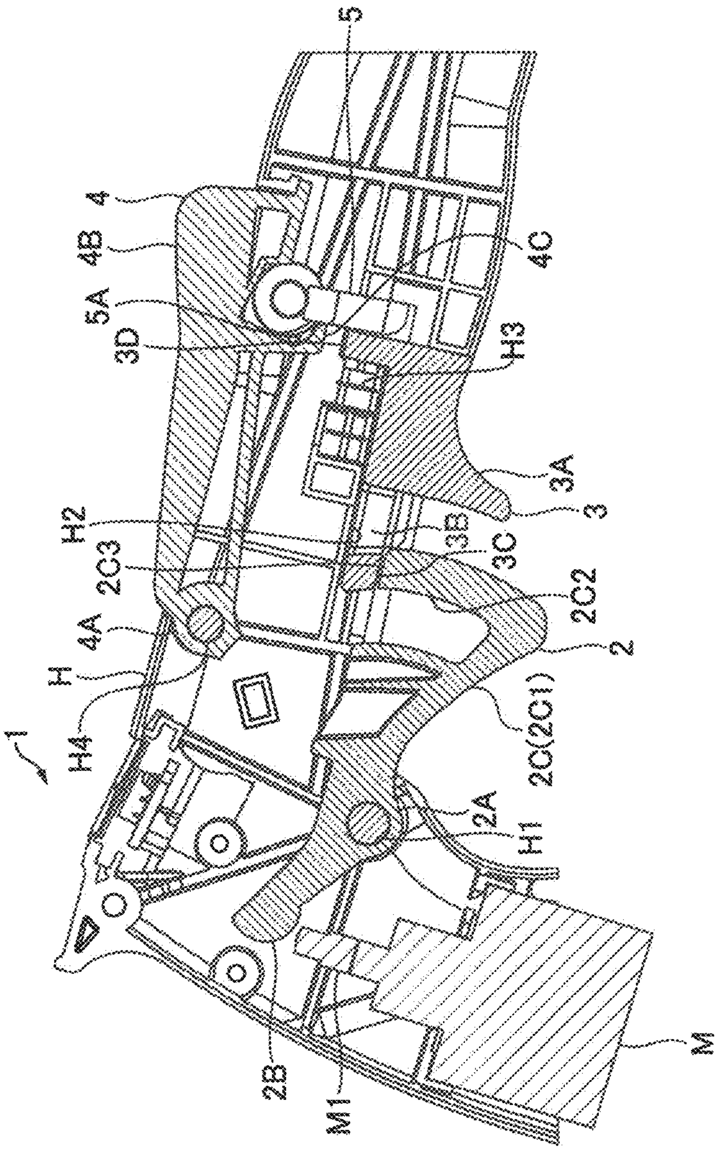
FIG. 2 is a view for illustrating the internal structure of the operating lever mechanism according to an embodiment of the invention in the unoperated state.

FIG. 2 illustrates a state where the trigger lever 2, the slide member 3, and the grip lever 4 are in the unoperated state. In this state, the stopper 4C of the grip lever 4 abuts on a stopper face 5A of the cooperating member 5, and therefore the slide member 3 engaged with the cooperating member 5 cannot be slid. In addition, in this state, the interference end 2C3 of the trigger lever 2 abuts on the lock abutting part 3C of the slide member 3, and therefore the trigger lever 2 cannot be moved in the operating direction, that is, is locked. Therefore, in this state, even though the trigger lever 2 is operated independently, it cannot be moved. This locked state eliminates a situation in which the trigger lever 2 is accidentally operated.

Figure 3:
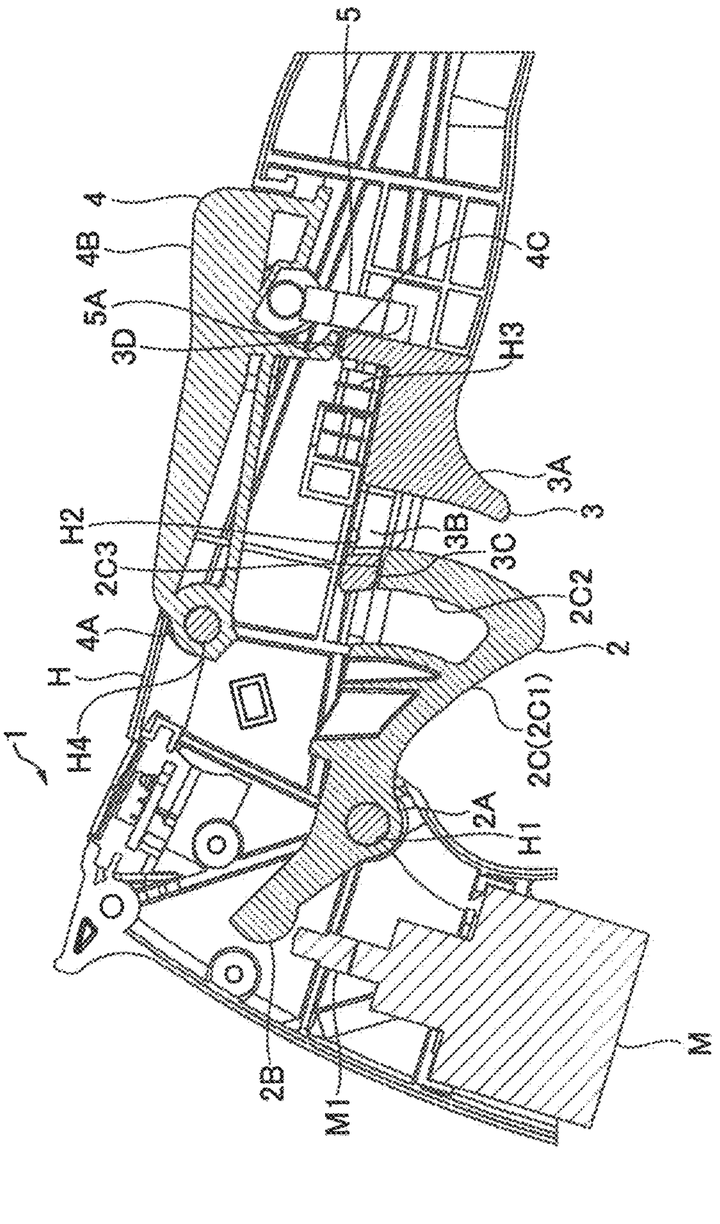
FIG. 3 is a view for illustrating the internal structure of the operating lever mechanism according to an embodiment of the invention when a grip lever is operated.

FIG. 3 illustrates a state where the operator grips the handle H by one hand to operate the grip lever 4. When the grip lever 4 is operated, the stopper 4C of the grip lever 4 is moved and brought close to the slide member 3, abuts on a slide face 3D of the slide member 3, and stops. In this state, the stopper 4C of the grip lever 4 leaves the stopper face 5A of the cooperating member 5, and therefore the operator can slide the slide member 3.

Figure 4:
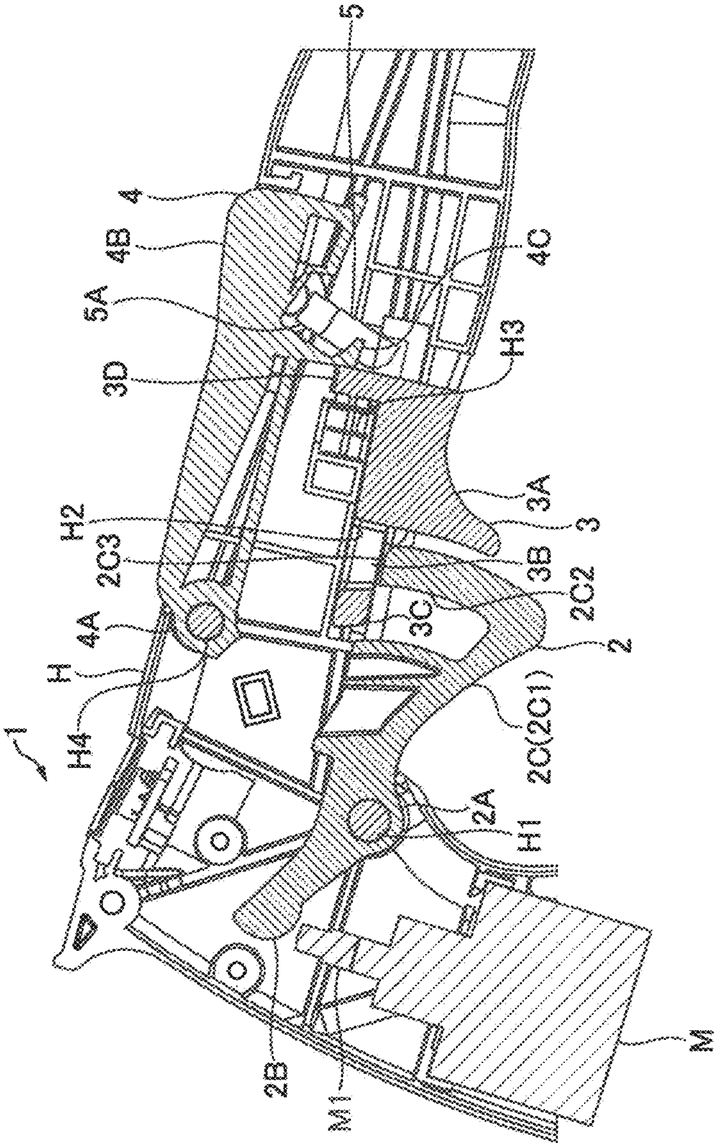
FIG. 4 is a view for illustrating the internal structure of the operating lever mechanism according to an embodiment of the invention when the grip lever and a slide member are operated.

FIG. 4 illustrates a state where the operator slides the slide member 3 by the middle finger while gripping the handle H by one hand to operate the grip lever 4 by the palm. The slide face 3D is parallel to the sliding direction of the slide member 3 to allow the slide member 3 to slide even though the stopper 4C of the grip lever 4 abuts on the slide face 3D of the slide member 3. When the operator slides the slide member 3 to the slide end on the fingertip side, the cooperating member 5 is moved together with the slide member 3 and inclined, and therefore the stopper 4C of the grip lever 4 can be inserted in space under the stopper face 5A of the cooperating member 5. Then, when the grip lever 4 is further pushed into the handle H while the slide member 3 is slid to the fingertip side, the stopper 4C of the grip lever 4 is moved into space behind the slide face 3D of the slide member 3. As a result, the slide member 3 is held at the slide end on the fingertip side. In this state, the interference end 2C3 of the trigger lever 2 faces the unlocking hole 3B of the slide member 3, and the lock abutting part 3C of the slide member 3 faces the escape groove 2C2 of the trigger lever 2. Therefore, the trigger lever 2 can be operated, that is, the trigger lever 2 is unlocked.

Figure 5:
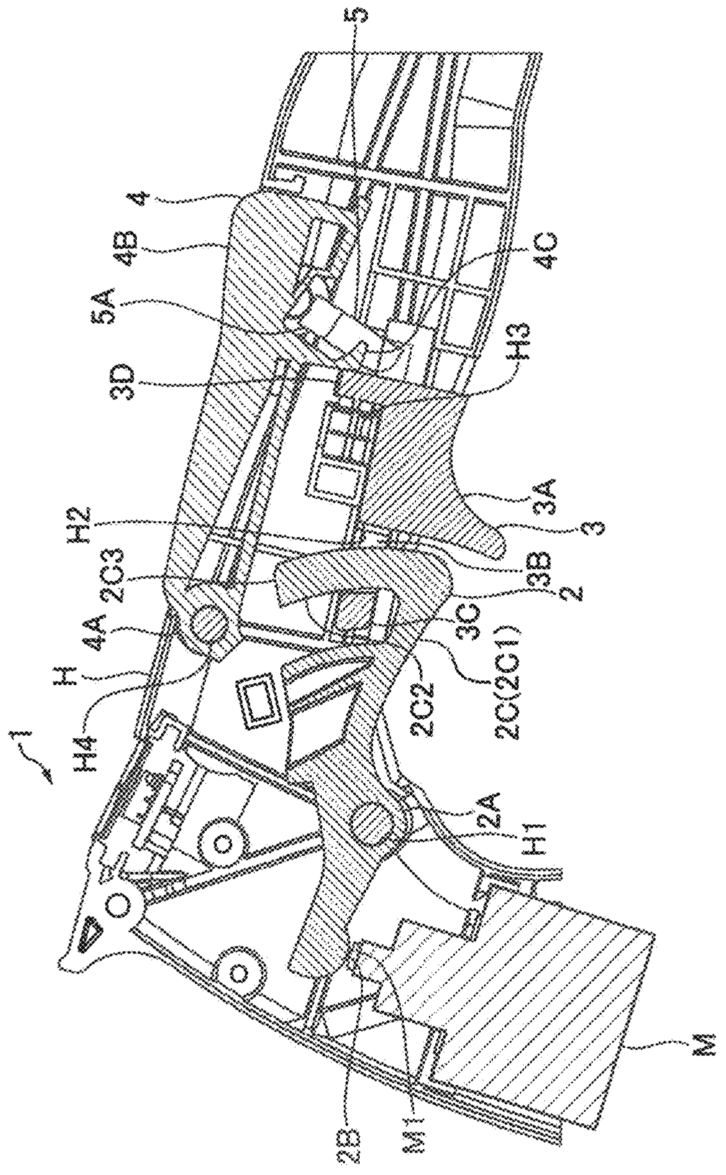
FIG. 5 is a view for illustrating the internal structure of the operating lever mechanism according to an embodiment of the invention when the grip lever, the slide member, and a trigger lever are operated.

FIG. 5 illustrates a state where the operator slides the slide member 3 by the middle finger while gripping the handle H by one hand to operate the grip lever 4 by the palm, so that the trigger lever 2 is unlocked, and performs the ON operation of the trigger lever 2. When the ON operation of the trigger lever 2 is performed as illustrated, the interference end 2C3 of the trigger lever 2 is inserted into the unlocking hole 3B of the slide member 3, and the lock abutting part 3C of the slide member 3 is inserted into the escape groove 2C2 of the trigger lever 2. As a result, the trigger lever 2 is rotated around the shaft protrusion H1, so that the actuation part 2B of the trigger lever 2 presses the switch M1 of the electric actuator M. By this means, the electric actuator M is actuated to start the electric working device.

In the state illustrated in FIG. 5, when the operator stops the ON operation of the trigger lever 2, the trigger lever 2 returns to the unoperated state by the spring force ("OFF operation"), so that the switch M1 is turned off. However, the operator keeps gripping the handle H by the one hand, and therefore the slide member 3 is held in the slid state. By this means, the trigger lever 2 keeps unlocked, and therefore it is possible to repeatedly perform the ON/OFF operation of the trigger lever 2. When the operator releases the grip of the handle H, the trigger lever 2, the slide member 3, and the grip lever 4 are returned to the unoperated state as illustrated in FIG. 2 by the spring force. As a result, the trigger lever 2 is locked again.

To conclude, the operating lever mechanism 1 according to the embodiment of the invention has the following features.

First, the operator slides the slide member 3 while gripping the handle H by one hand to operate the grip lever 4, so that the trigger lever 2 is unlocked. In this way, to unlock the trigger lever 2 requires two actions in the different directions. This meets the standard for safety measures (IEC standard 62841-1). One of the two actions, the operation of the grip lever 4 can be achieved by the essential action, that is, gripping the handle H by one hand. By this means, only by sliding the slide member 3 as an additional operation, the trigger lever 2 can be unlocked, and therefore it is possible to eliminate the complicated operation.

In addition, by gripping the handle H by one hand, the grip lever 4 holds the slide member 3 in the slid state. Therefore, the trigger lever 2 remains unlocked as long as the operator keeps gripping the handle H by one hand, and in this state, it is possible to repeatedly perform the ON/OFF operation of the trigger lever 2. By this means, it is possible to solve the complexity that the trigger lever 2 needs to be unlocked every time the ON/OFF operation of the trigger lever 2 is performed.

In addition, when the grip lever 4 and the slide member 3 are not operated, a part of the grip lever 4 is located to interfere with the movement of the cooperating member 5 not to allow the slide member 3 to slide, and when the grip lever 4 is operated, the part of the grip lever 4 is located not to interfere with the cooperating member 5 to allow the slide member 3 to slide. In this way, the slide member 3 can be operated or cannot be operated via the cooperating member 5, in accordance with whether the grip lever 4 is operated. Therefore, compared to a case where the grip lever 4 directly interferes with the slide member 3, it is possible to improve the freedom to arrange the grip lever 4 and the slide member 3.

Moreover, the cooperating part 5 moves together with the slide member 3 being slid, and holds the slid state of the slide member 3 in the operated state of the grip lever 4. By this means, the grip lever 4 is operated by the grip strength of one hand gripping the handle H, and the cooperating member 5 keeps the slide member 3 in the slid state by using the grip strength. Therefore, there is no need to tightly hold the slide member 3 by the finger operating the slide member 3, and consequently it is possible to reduce the load on the finger.

Moreover, the trigger lever 2, the slide member 3, and the grip lever 4 are spring energized by the spring to place them in the unoperated state. By this means, when the operator takes the hand off the handle H, the trigger lever 2, the slide member 3, and the grip lever 4 are returned to the unoperated state by the spring force, and the trigger lever 2 is locked again. Therefore, after the operator takes the handle H off the hand once, it is possible to certainly eliminate the situation where the trigger lever 2 is accidentally operated to start the electric working device.

Furthermore, the trigger lever 2 is provided in the position that allows the trigger lever 2 to be operated by the index finger while the handle H is gripped by one hand. The slide member 3 is provided in the position that allows the slide member 3 to be operated by the middle finger or the third finger while the handle H is gripped by one hand. The grip lever 4 is provided in the position that allows the grip lever 4 to be operated by the palm while the handle H is gripped by one hand. By this means, it is possible to operate the trigger lever 2, the slide member 3, and the grip lever 4 while the operator grips the handle H by one hand, putting the thumb on the handle H. Therefore, it is possible to operate the levers in a stable state while maintaining the grip strength of the hand gripping the handle H.

Furthermore, the protruding part 3A of the slide member 3 being operated by the finger is brought close to the trigger lever 2 to unlock the trigger lever 2. By this means, the protruding part 3A of the slide member 3 is always close to the wrist side of the unlocked trigger lever 2. In this way, the protruding part 3A is located close to the wrist side of the trigger lever 2, and therefore when the trigger lever 2 is operated by the index finger, it is possible to eliminate a situation in which the middle finger and the third finger are caught by the trigger lever 2. Consequently, it is possible to safely operate the trigger lever 2.

Figure 6:
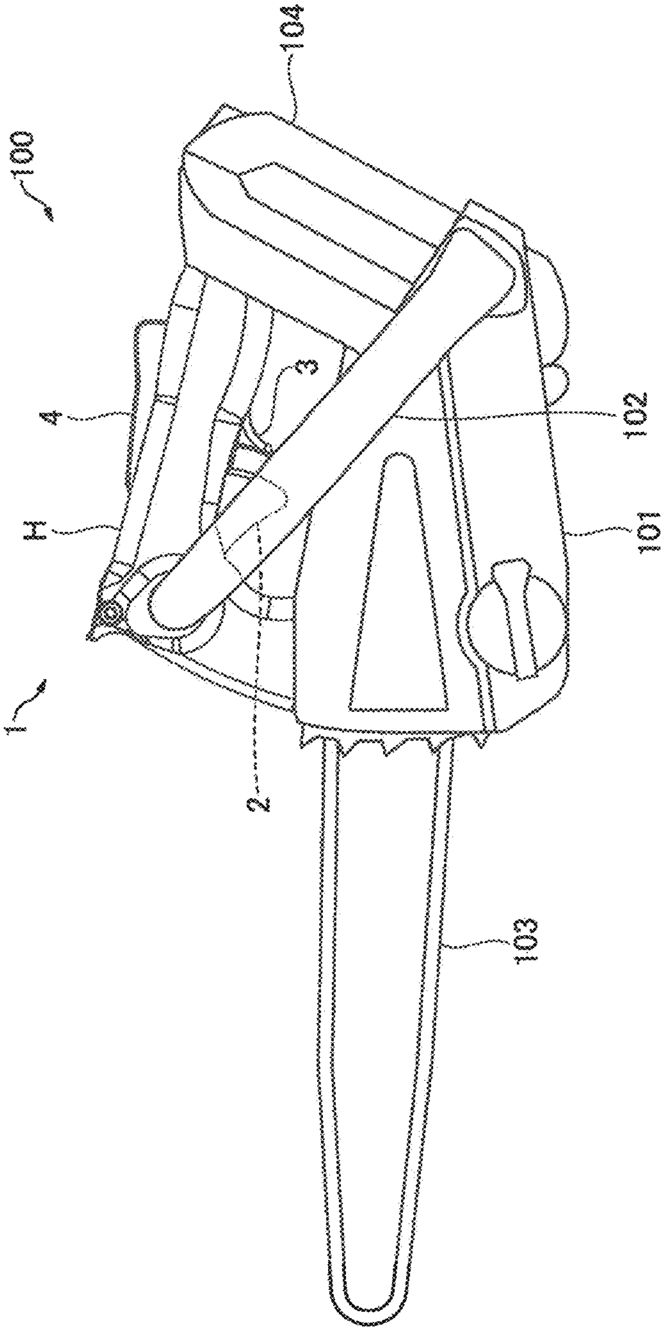
FIG. 6 is a side view illustrating an electric handheld working machine with the operating lever mechanism according to an embodiment of the invention.

FIG. 6 illustrates an electric chain saw 100 as an example of the electric handheld working machine with the operating lever mechanism 1 described above. The chain saw 100 includes the above-described handle H provided on the top of a main body 101. The handle H includes the trigger lever 2, the slide member 3, and the grip lever 4. The illustrated chain saw 100 includes an auxiliary handle 102 connecting the handle H to the rear part of the main body 101; an electric working device 103 with a chain cutter blade provided in front of the main body 101; and a battery 104 as a power source of the electric working device 103 provided on the rear side of the main body 101.

The operating lever mechanism 1 according to the embodiment of the invention is effectively applied to not only the chain saw 100 as described above, but also an electric handheld working machine such as a brush cutter, a hedge trimmer, and a power cutter with a rotary disc blade, which includes an electric working device required to assure the safety by avoiding accidental actuation.

According to the above-described features, although two actions, that is, operating the grip lever and sliding the slide member, are required to unlock the trigger lever, it is possible to easily operate the grip lever, the slide member, and the trigger lever while the handle is gripped by one hand. In addition, it is possible to operate the trigger lever, the grip lever, and the slide member without using the thumb, and therefore it is possible to unlock the trigger lever with good operationality without decreasing the grip strength while gripping the handle by one hand. By this means, according to the operating lever mechanism for an electric handheld working machine, it is possible to secure the operationality comparable with the engine-driven type while meeting the safety standard for unlocking the trigger lever.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. An operating lever mechanism provided in a handle of an electric handheld working machine, comprising:

a trigger lever to actuate an electric working device;

a slide member provided to be able to slide in a direction in which the handle extends, the slide member being configured to lock the trigger lever when the slide member is not operated, and to unlock the trigger lever when the slide member is slid; and a grip lever operated by gripping the handle by one hand, the grip lever being configured not to allow the slide member to slide when the grip lever is not operated, and to allow the slide member to slide when the grip lever is operated, wherein the slide member is slid while the handle is gripped by the one hand and the grip lever is operated, and therefore the trigger lever is unlocked.

2. The operating lever mechanism for an electric handheld working machine according to claim 1, wherein by gripping the handle by one hand, the grip lever holds the slide member in a slid state.

3. The operating lever mechanism for an electric handheld working machine according to claim 1, further comprising a cooperating member provided in the handle and configured to move together with the slide member, wherein:

when the grip lever is not operated, a part of the grip lever is located to interfere with movement of the cooperating member not to allow the slide member to slide; and when the grip lever is operated, the part of the grip lever is located not to interfere with the cooperating member to allow the slide member to slide.

4. The operating lever mechanism for an electric handheld working machine according to claim 3, wherein the cooperating member moves together with the slide member being slid, and holds a slid state of the slide member in an operated state of the grip lever.

5. The operating lever mechanism for an electric handheld working machine according to claim 1, wherein the trigger lever, the slide member, and the grip lever are spring energized to be placed in an unoperated state.

6. The operating lever mechanism for an electric handheld working machine according to claim 1, wherein:

the trigger lever is provided in a position that allows the trigger lever to be operated by an index finger while the handle is gripped by the one hand;

the slide member is provided in a position that allows the slide member to be operated by a middle finger or a third finger while the handle is gripped by the one hand; and the grip lever is provided in a position that allows the grip lever to be operated by a palm while the handle is gripped by the one hand.

7. The operating lever mechanism for an electric handheld working machine according to claim 6, wherein a protruding part of the slide member being operated by a finger is brought close to the trigger lever to unlock the trigger lever.

* * * * *